Patented Apr. 18, 1950

2,504,208

UNITED STATES PATENT OFFICE 2,504,208

PROCESS OF PRODUCING POROUS MATERIALS

Ronald Stanley Locke and Arthur John Daly, Spondon, near Derby, England, assignors to Celanese Corporation of America, a corporation of Delaware No Drawing. Application December 10, 1946, Serial No. 715,334. In Great Britain December 21, 1945

4 Claims. (Cl. 18—48)

This invention relates to the process of producing porous materials, and has as its primary object to provide a microporous material suitable for use as a battery plate separator in electrical storage batteries of the lead-sulphuric acid kind.

As plate-separators for batteries of the kind referred to above, diaphragms of acid-treated wood have hitherto been used. Wood of the required quality is now, however, in short supply, and many efforts have been made to provide a satisfactory substitute. This is not easy, since the material of the plate-separator has to be capable of withstanding sulphuric acid of specific gravity of about 1.25, at temperatures up to about 55° C. for prolonged periods; it has to be sufficiently porous to allow free passage of ions, and at the same time, to be strong in tension and compression and of high impact-strength.

Attempts to produce a satisfactory microporous material by moulding compositions comprising an acid-resistant cellulose derivative and a porous insoluble filler, for example asbestos fibres, asbestos floats, sawdust and wood flour, proved unsatisfactory in that when the filler was sufficiently coarse-grained to give the desired porosity, the material was found to become very brittle after exposure to the battery acid.

We have now found that a micro-porous material, which is very satisfactory for the purpose referred to above, can be made by forming a coherent material from a composition comprising a cellulose ester resistant to battery acid and a substance insoluble in said ester but capable of extraction from the said coherent material by means of a liquid which does not attack the cellulose ester, the said substance being present in sufficient proportion to give the desired porosity when extracted, and extracting said substance by means of such a liquid.

As the cellulose ester we may use a mixed ester of cellulose containing the radicles of acetic acid and a higher homologue therefor, said ester containing at least 0.3 radicle derived from the higher acid, and not more than 0.3 hydroxyl groups per glucoside unit.

Such esters in comparison with acid-resistant thermosetting synthetic resins, e. g. phenol-aldehyde synthetic resins, are of very much higher impact strength. Compared with acid-resistant thermoplastic synthetic resins such as polyvinyl chloride, these esters are of higher heat-softening point besides being more easily workable. Preferably the mixed ester of cellulose is an acetostearate containing at least 0.35 stearyl groups and at least 2.3 acetyl groups per glucoside residue.

The substance to be extracted to impart the desired micro-porosity to the material is preferably a starch. Starches of small average grain-size such as wheat-starch and especially maize starch are particularly suitable. Instead of a starch we may employ water-soluble gums such as dextrin and gum arabic, water-soluble cellulose derivatives such as methyl cellulose or other water-soluble high polymers, i. e. polymers of molecular weight (osmotic) at least 10,000, especially carbohydrates, but including also synthetic polymers such as polyvinyl alcohol and polyacrylic acid. The substance to be extracted should be present in proportions by weight at least equal to the proportion of cellulose ester. A suitable range of proportions is 100 to 400% of the weight of the ester.

Various methods are available for making the coherent material containing the ester and the substance to be extracted. Preferably this material is made by a hot compression moulding operation from a moulding composition containing the ester and the extractable substance. Other methods, however, are available, for example the coherent material may be extruded from a suitable composition containing the ester and the extractable substance.

Moulding compositions suitable for formation into the coherent material containing the cellulose ester and the extractable substance may be made by grinding the starch or other extractable substance in a hot solution of the cellulose ester in a liquid which is not a solvent therefore at ordinary temperatures, so that on cooling the cellulose ester coheres to the particles of the starch of the like. The powder is then dried free of the solvent.

To achieve the desired moulding properties in the moulding composition a plasticiser for the cellulose ester may be necessary. This may be introduced at any suitable stage, for example it may be dissolved in the hot solution of the cellulose ester. The plasticiser should of course be resistant to battery acid. Among the best plasticisers from this point of view are triaryl phosphates, e. g. triphenyl phosphate and tricresyl phosphate.

The extraction of the starch or other extractable substance from the coherent material to form the micropores may be carried out by subjecting the material to the action of a suitable non-alkaline aqueous liquid, e. g. battery acid, or aqueous sulphuric acid of lower concentration than battery acid. Naturally the extracting medium chosen must be one that dissolves or disintegrates the extractable substance without attacking the cellulose ester.

The following examples illustrate the invention:

Example 1

The solution of the mixed ester of cellulose employed has the following composition, the parts being by weight:

20 parts of cellulose aceto-stearate containing 38.1% of combined acetic acid and 30.5% of combined stearic acid
4 parts of triphenyl phosphate
70 parts of ethanol
28 parts of acetone The solution is made by mixing the constituents and warming in a closed vessel. The solution so obtained is mixed hot with 96 parts of maize starch. The mixture is ground thoroughly and the resulting powder is dried substantially free from acetone and ethanol. From this powder plate-separators are moulded at 190° C. for fifteen minutes under a pressure of 2,000 lbs. per square inch. The plates are immersed in 10% sulphuric acid for twenty-four hours to remove the starch. They are washed and dried and are then ready for use.

Example 2

The process is carried out as Example 1, but using only 24 parts of starch instead of 96.

The method described in the above examples enables plates to be made which are strong and resilient; of high water absorption (over 50% of their weight in 96 hours), and capable of use as battery plate-separators for long periods without deterioration.

Although it is preferred to employ a cellulose aceto-stearate as the basis of the separator-elements of the invention, other mixed esters containing at least 0.3 higher fatty acid radicle and not more than 0.3 hydroxyl group per glucoside residue can be used. Preferably, the higher fatty acid radicle of such esters is derived from an acid containing at least ten carbon atoms. Suitable esters are found among the cellulose acetate-laurates and the cellulose acetate-stearates.

The process of the invention, although of particular advantage in the production of battery separators, may also be employed in the manufacture of strong micro-porous materials for other purposes, for example for use as dust filters for gases.

Having described our invention, what we desire to secure by Letters Patent is:

1. Process for producing micro-porous material suitable for use in separating the plates of a lead-sulphuric acid electric battery, by forming a coherent material from a composition comprising a mixed ester of cellulose containing the radicals of acetic acid and of a fatty acid containing at least 10 carbon atoms, together with 100 to 400% based on the weight of said ester of starch, and extracting the starch from the coherent material by means of dilute sulphuric acid.

2. Process according to claim 1, wherein the cellulose ester contains at least 0.3 radical derived from the higher fatty acid, and not more than 0.3 hydroxyl group per glucose unit of cellulose and the starch is maize starch.

3. Process according to claim 1, wherein the cellulose ester is an acetate stearate containing at least 0.35 stearyl group and at least 2.3 acetyl groups per glucose residue and the starch is maize starch.

4. Process according to claim 1, wherein the cellulose ester is an acetate laurate containing at least 0.3 lauryl radical and not more than 0.3 hydroxyl radical per glucose residue and the starch is maize starch.

RONALD STANLEY LOCKE.
ARTHUR JOHN DALY.

REFERENCES CITED

The following references are of record in the file of this patent:

UNITED STATES PATENTS

| Number | Name | Date |
| --- | --- | --- |
| 1,142,619 | Pum | June 8, 1915 |
| 1,206,983 | Bliss | Dec. 5, 1916 |
| 1,474,830 | Lyndon | Nov. 20, 1923 |
| 1,884,289 | Schuhmann et al. | Oct. 25, 1932 |
| 1,903,960 | Dreyfus | Apr. 18, 1933 |
| 1,974,393 | Mostny | Sept. 18, 1934 |
| 2,116,611 | Vautier | May 10, 1938 |